(12) United States Patent
Barton

(10) Patent No.: US 6,446,002 B1
(45) Date of Patent: Sep. 3, 2002

(54) ROUTE CONTROLLED AUDIO PROGRAMMING

(75) Inventor: Mark Barton, Schaumburg, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/891,547

(22) Filed: Jun. 26, 2001

(51) Int. Cl.$^7$ ................................................. G01C 21/30
(52) U.S. Cl. ..................... 701/211; 701/35; 701/200; 701/207; 340/988
(58) Field of Search ........................... 701/23, 65, 200, 701/206, 207, 208, 209, 211, 35; 340/988, 990, 995

(56) References Cited

U.S. PATENT DOCUMENTS 6,085,137 A * 7/2000 Aruga et al. .................. 701/51
6,208,934 B1 * 3/2001 Bechtolsheim et al. ...... 701/209
6,266,614 B1   7/2001 Alumbaugh ................. 701/211
6,317,882 B1 * 11/2001 Robbins ........................ 725/34

* cited by examiner

*Primary Examiner*—Gertrude Arthur
(74) *Attorney, Agent, or Firm*—Frank J. Kozak; Jon Shutter; Lawrence M. Kaplan

(57) ABSTRACT

A feature implemented on a navigation system in a vehicle whereby the user of the vehicle selects one or more types of audio programs and associates each type of audio program with a specific location along a predetermined route. As the vehicle is being driven along the route, audio programs of the types selected by the user are obtained and stored in a memory. When the vehicle reaches the location associated with one of the selected types of audio programming, the stored audio program of the selected type is presented to the user.

20 Claims, 10 Drawing Sheets

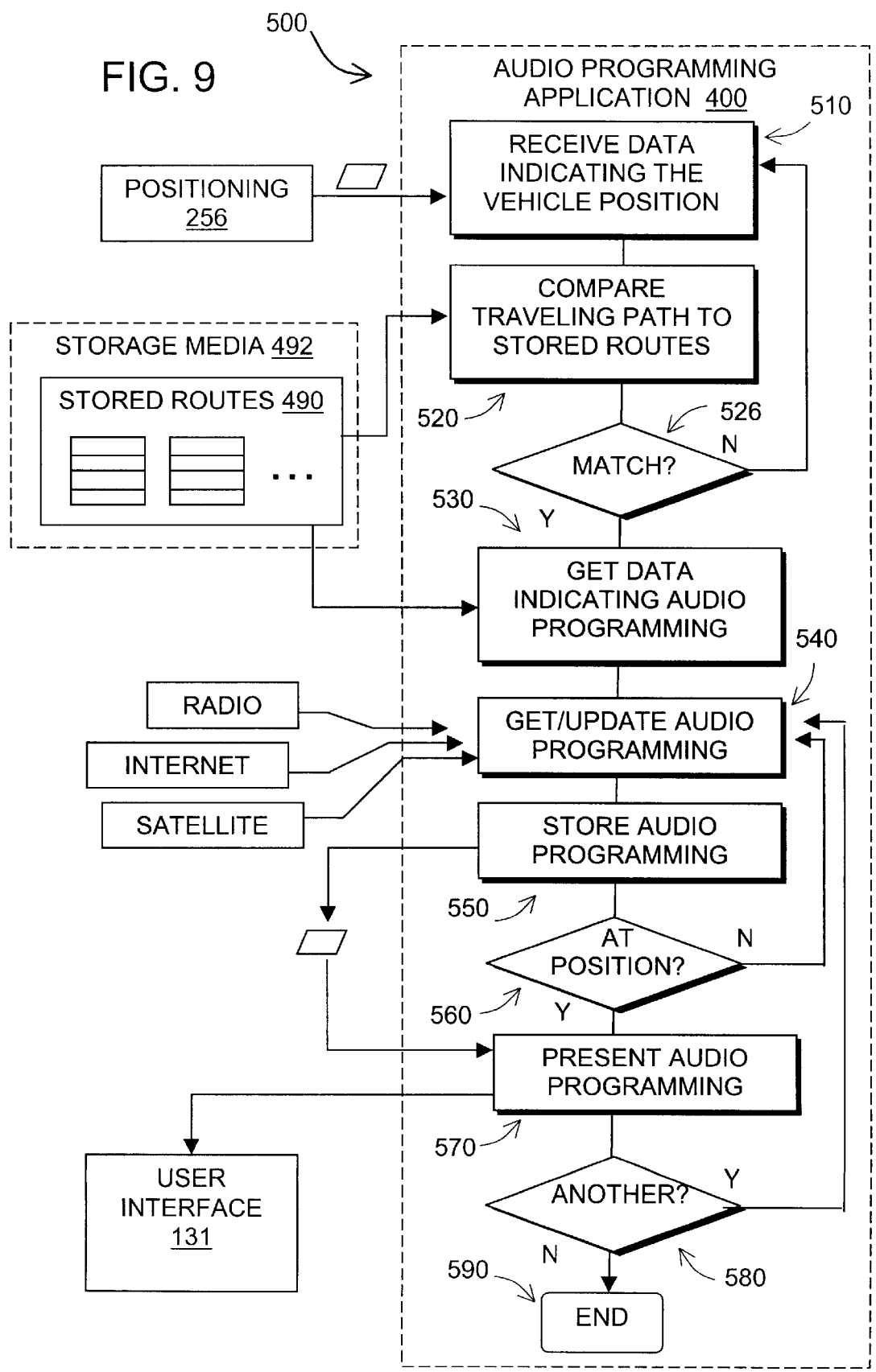

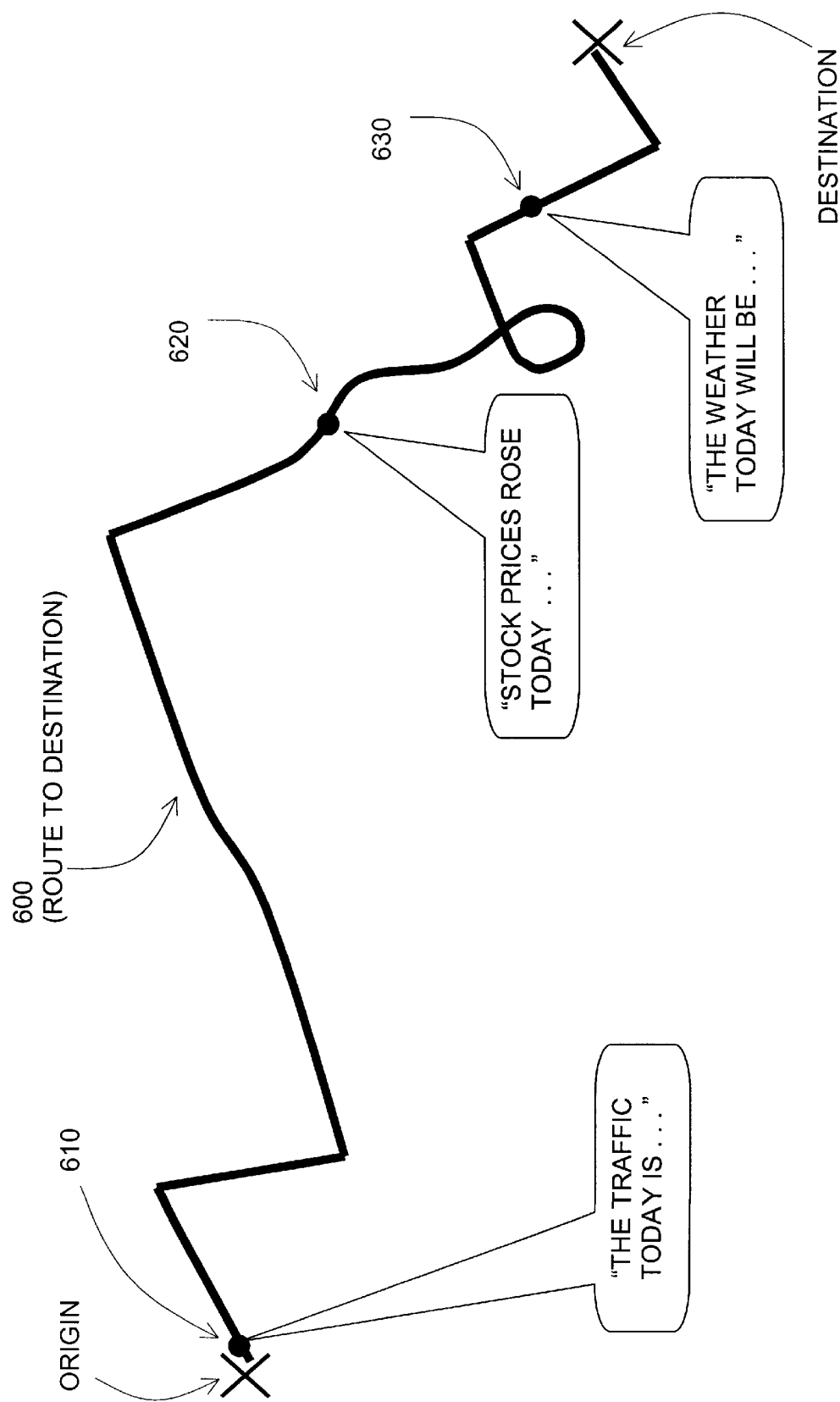

ROUTE CONTROLLED AUDIO PROGRAMMING

BACKGROUND OF THE INVENTION

The present invention relates to vehicle navigation systems and more particularly, the present invention is a feature provided by a vehicle navigation system whereby a user of the vehicle navigation system can specify types of audio programming to be provided to the vehicle user at designated locations along a route to a destination.

Navigation systems are available that provide end users with various navigation-related features. Some navigation systems are installed in vehicles and are able to provide end users of the navigation systems (such as the drivers of the vehicles in which the navigation systems are installed) with various useful features associated with driving the vehicles. For example, some navigation systems are able to determine optimum routes to travel by roads between locations in a geographic region. Using input from the end user, and optionally from equipment that can determine one's physical location (such as a GPS system), a navigation system can examine various routes between two locations to determine an optimum route to travel from a starting location to a destination location in a geographic region. The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region. A geographic database used by a navigation system may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many important features, there continues to be room for improvements. One area in which there is room for improvement relates to enhancing the experience of driving. As an example, people who drive may prefer to listen to CD's or tapes, but listen to the radio instead in order to hear traffic or weather reports.

Accordingly, it is an objective to use a navigation system to enhance the experience of driving.

SUMMARY OF THE INVENTION

To address these and other objectives, the present invention comprises a feature implemented by a navigation system whereby the user of a vehicle selects one or more types of audio programs and associates each type of audio program with a specific location along a predetermined route. As the vehicle is being driven along the route, audio programs of the types selected by the user are obtained and stored in a memory. When the vehicle reaches the location associated with one of the selected types of audio programming, the stored audio program of the selected type is presented to the user.

BRIEF DESCRIPTION OF THE DRAWINGS

FIG. 9 is a flowchart that shows steps performed during operation of an embodiment of the route-controlled audio programming feature provided by the navigation system of FIG. 1.

FIG. 10 is an illustration of the route-controlled audio programming feature provided by the navigation system of FIG. 1.

DETAILED DESCRIPTION OF THE PRESENTLY PREFERRED EMBODIMENTS

I. EXEMPLARY NAVIGATION SYSTEM PLATFORM

A. Overview

Figure 1:
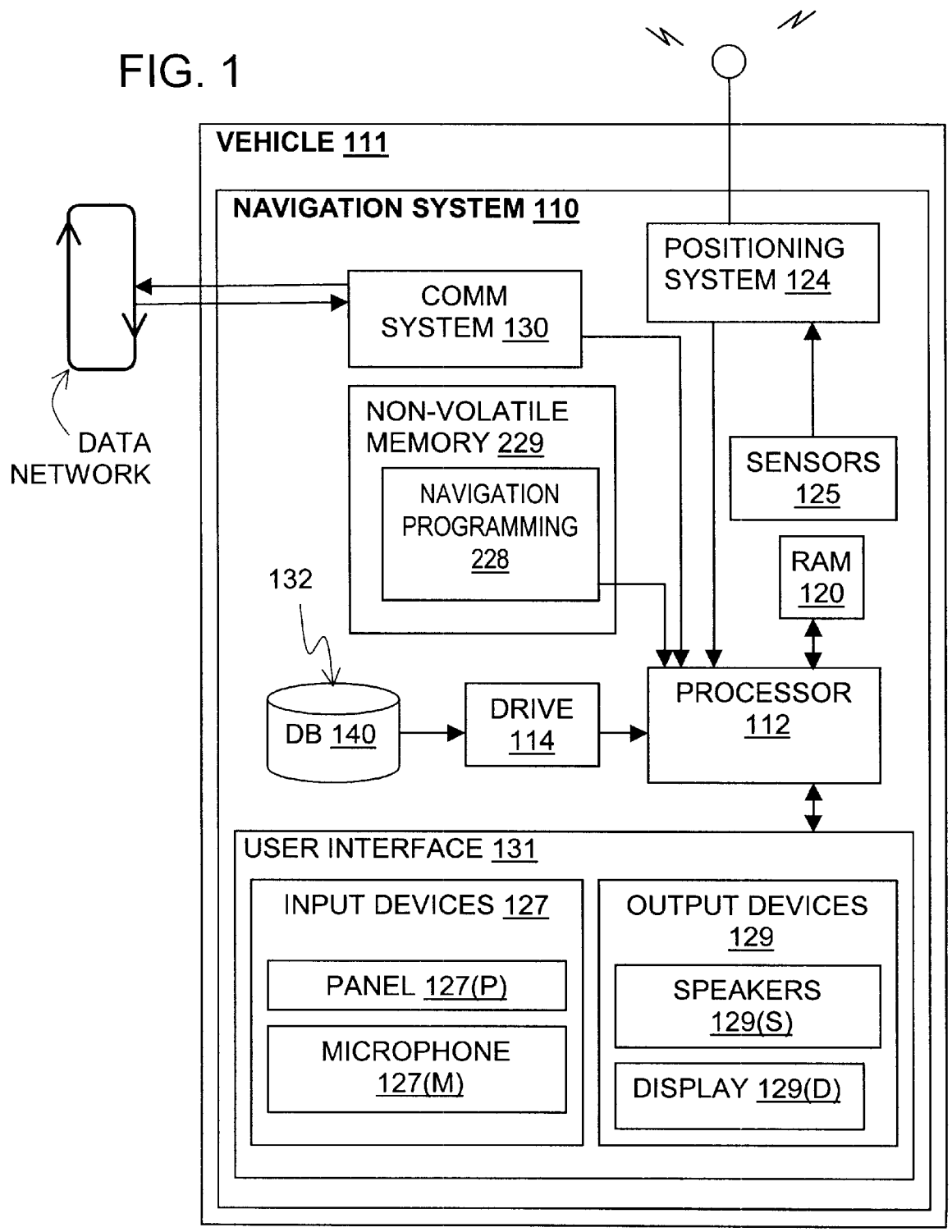
FIG. 1 is a block diagram of a navigation system installed in a vehicle.

FIG. 1 is a diagram illustrating an exemplary embodiment of a navigation system 110. In the embodiment shown in FIG. 1, the navigation system 110 is located in a vehicle 111, such as an automobile, truck, motorcycle, bicycle, or bus.

The navigation system 110 is a combination of hardware and software components. The hardware components of the navigation system 110 may include a processor 112, memory 120, and so on. In the embodiment of FIG. 1, the navigation system 110 also includes a positioning system 124 that determines the position of the vehicle 111 in which it is installed. The positioning system 124 may include sensors 125 or other components that sense the speed, orientation, direction, acceleration, and so on, of the vehicle 111. The positioning system 124 may also include a GPS system.

The navigation system 110 also includes a user interface 131. The user interface 131 includes appropriate means 127 for receiving instructions and/or input from an end user of the navigation system. The instruction receiving means 127 may include a keyboard, keypad, or other type of input panel 127(P), a microphone 127(M), as well as other means for accepting end-user input, such as voice recognition software, and so on, through which the end user may request navigation information and services. The user interface 131 also includes appropriate means 129 for providing information back to the end user. The information providing means 129 may include a display 129(D) and speakers 129(S) (including speech synthesis hardware and software) through which the end user can be provided with information and services from the navigation system 110.

The navigation system 110 includes a communications system 130. The communications system 130 in the navigation system 110 includes hardware and software components that provide for exchanging data over a wireless communications network. Using the communications system 130, the navigation system 110 can exchange data with remotely located entities, such as navigation services providers. Using the communications system 130, the navigation system 110 can connect to various data networks, including the Internet. The communications system 130 interfaces with other components in the navigation system 110.

All of the components described above may be conventional (or other than conventional) and the manufacture and use of these components are known to those of skill in the art.

B. The Geographic Database

In order to provide navigation features to an end user, the navigation system 110 uses geographic data 140. The geographic data 140 includes information about one or more geographic regions or coverage areas. The geographic data 140 may be stored in the vehicle 111, or alternatively, the geographic data 140 may be stored remotely and made available to the navigation system 110 in the vehicle 111 through the communication system 130. In another alternative, a portion of the geographic data 140 may be stored in the vehicle 111 and a portion of the geographic data 140 may be stored in a remote location and made available to the navigation system 110 in the vehicle 111 over the wireless communication system 130 from the remote location.

In the embodiment shown in FIG. 1, some of the geographic data 140 are stored on a medium 132 which is located in the vehicle 111. Accordingly, the navigation system 110 includes a drive 114 (or other suitable peripheral device) into which the medium 132 can be installed and accessed. In one embodiment, the storage medium 132 is a CD-ROM disk. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 may take a variety of different forms. In one embodiment, the geographic data 140 are in the form of one or more computer-readable data files or databases. The geographic database includes data specifying the positions of the roads in the covered geographic region(s). The geographic database also includes data relating to the roads, such as restrictions on directions of travel along the roads (e.g., one-way streets), street addresses along the roads, street names, speed limits along the roads, turn restrictions at intersections, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic database 140 may include other kinds of data about the geographic area.

In the ebodiment of FIG. 1, the navigation system 110 uses the communications system 130 to obtain additional data from a remotely located navigation services server. The additional data that the navigation system 110 may obtain include updated data (e.g., data that updates the data in the geographic database 140 stored locally in the navigation system 110), traffic data, or other types of information.

In one embodiment, the geographic data are provided by Navigation Technologies Corporation of Chicago, Ill. However, it is understood that the inventive concepts disclosed herein are not restricted to any particular source of data.

C. The Navigation Programming

Referring again to FIG. 1, in addition to the hardware components and geographic database, the navigation system 110 includes or uses navigation programming 228. The navigation programming 228 includes the software that provides for the functions and/or features performed by the navigation system 110. The navigation programming 228 uses the geographic data 140 in conjunction with input from the end user via the user interface 131, and possibly in conjunction with outputs from the positioning system 124, to provide various navigation-related features and/or functions.

The navigation programming 228 may be stored in a non-volatile storage medium 229 in the navigation system 110. Alternatively, the navigation programming 228 and the geographic data 140 may be stored together on a single storage device or medium. Alternatively, the navigation programming 228 may be located at a remote location and may be provided to or accessed by the navigation system 110 over a communications system.

In one embodiment, the navigation programming 228 is written in the C programming language although in alternative embodiments other programming languages may be used, such as C++, Java, Visual Basic, and so on.

Figure 2:
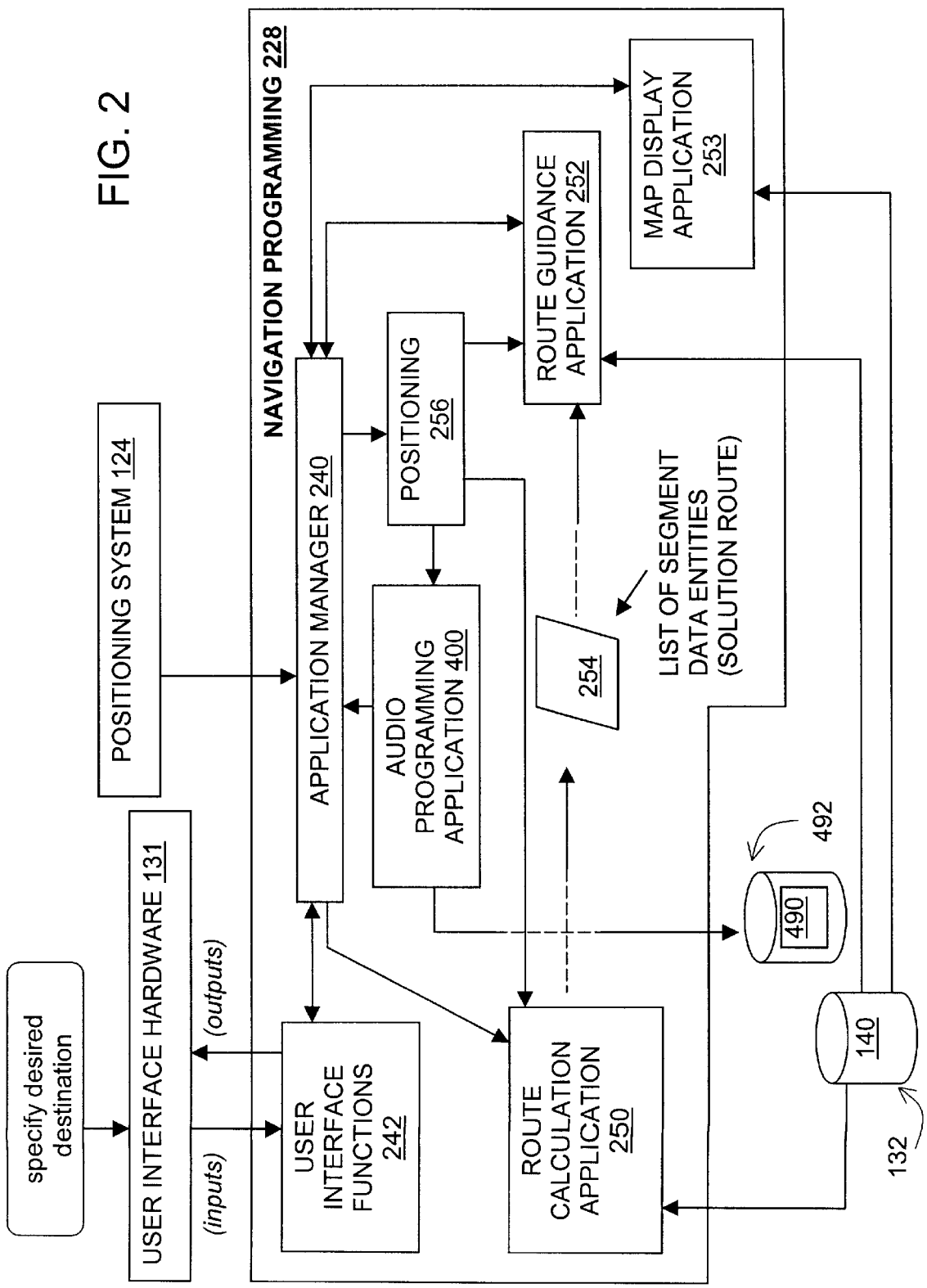
FIG. 2 is a block diagram showing some of the components of the navigation programming in FIG. 1.

The navigation programming 228 may be formed of separate component applications (also referred to as programs, subprograms, routines, or tools). The component applications of the navigation programming 228 work together through defined programming interfaces. FIG. 2 shows a block diagram illustrating some of the component applications for one embodiment of the navigation programming 228 included in the navigation system 110 of FIG. 1. In addition to the component programs shown in FIG. 2, the navigation programming 228 may include other component sub-routines or programs.

In FIG. 2, the navigation programming 228 is shown to include a navigation application manager 240. The navigation application manager 240 is a program or routine that provides for overall management of the functions of the navigation system 110. The navigation application manager 240 may also include support for and interfaces to the navigation system hardware, such as the positioning system 124 and the user interface 131. The navigation application manager 240 includes user interface functions 242 to interface with the user interface hardware 131. These user interface functions 242 may provide for presenting a menu to the end user on the screen display 129(D) of the user interface hardware 131, accepting inputs from the end user via the input devices 127 of the user interface hardware 131, displaying results to the end user on the screen display 129(D) of the user interface hardware 131, and so on.

The navigation programming 228 includes sub-programs or routines that interface with the navigation application manager 240 and that provide for specific navigation-related features or functions to be performed by the navigation system. These sub-programs include a route calculation application 250, a route guidance application 252, a map display application 253, and a positioning application 256. The navigation programming 228 may include navigation applications in addition to these.

The route calculation application 250 receives a request to calculate a route to a desired destination. The request may be in the form of an identification of a starting location and a desired destination location. The identification of these locations may include the geographic coordinates of these locations. The route calculation application may also be provided with other data or parameters, such as driving preferences (e.g., avoid toll roads). Given at least the identification of a starting location and a desired destination location, the route calculation application 250 attempts to determine one or more solution routes between the starting location and the destination location. A solution route is formed of a series of connected road segments over which a vehicle can travel from the starting location to the destination location. When the route calculation application 250 calculates a route, it accesses the geographic data 140 and obtains data that represent road segments around and between the starting location and the destination location. The road calculation application 250 uses the information to attempt to determine at least one valid solution route from the starting location to the destination location. In determining a valid solution route for a vehicle to travel, the route calculation program 250 uses the data attributes associated with the data to account for direction of travel restrictions (e.g., one-way streets), turn restrictions at intersections (e.g., no left turns), and so on. The route calculation application 250 may attempt to find a solution route that takes the least time to travel, that covers the least distance, or that meets some other specifiable criteria.

The route calculation application 250 may use various means or algorithms in determining solution routes. The present embodiment is not limited to any particular method of route calculation. Any suitable route calculation method now known or developed in the future may be employed.

The route calculation application 250 provides an output. In the embodiment of FIG. 2, the output of the route calculation application 250 is in the form of an ordered list 254 identifying a plurality of road segments. The plurality of road segments form the continuous navigable route between the origin and the destination that had been calculated by the route calculation application 250. (The route calculation application 250 may calculate more than one solution route.)

The list 254 of road segments determined by the route calculation application 250 is provided to the route guidance application 252. The route guidance application 252 uses the information in the list 254, as well as additional information from the geographic database 140, to provide instruvtions and advice to the end user to travel the route defined by the list 254 output by the route calculation application 250. The route guidance application 252 may include functions that identify locations along the calculated route at which maneuvering instructions may be provided to the end user. The route guidance application 252 may also include functions that formulate the maneuvering instructions for visual output and/or audio output. The route guidance application 252 may provide the maneuvering instructions all at once, or alternatively, the route guidance application 252 may provide the maneuvering instructions one at a time as the vehicle is traveling. In one embodiment, each maneuvering instruction is provided separately (or in small groups of combined maneuvering instructions) in advance of when the specific maneuver is required to be taken so that the end user can prepare to make the required maneuver.

In order to provide maneuvering instructions at appropriate times and/or locations, the navigation system 110 uses data from the positioning system 124. The positioning system 124 determines the position of the vehicle as it is traveling. The positioning application 256 in the navigation programming 228 compares the vehicle position determined by the positioning system 124 to the positions of the road segments in the solution driving route 254. Using this comparison, the maneuver instructions, which are related to positions along the solution route, can be provided at appropriate times as these positions are approached.

The list 254 of road segments from the route calculation application 250 may also be provided to the map display application 253. The map display application 253 uses the information in the list 254, as well as additional information from the geographic database 140, to provide graphical maps on the display (129(D) in FIG. 1) of the user interface 131. The graphical maps illustrate the areas through which the calculated route passes. The path of the calculated route may be highlighted on the displayed maps. The map display application 253 interfaces with the navigation application manager 240 so that the display maps are provided as the vehicle is traveling the calculated route. The navigation application manager 240 and the map display application 253 may receive the outputs from the positioning system 124 and the positioning application 256 for this purpose.

II. ROUTE-CONTROLLED AUDIO PROGRAMMING

According to a first embodiment, the navigation system 110 includes a feature whereby an end user can associate types of audio programming to be presented to the end user at specific locations along a route. Then, as the vehicle is driven along the route, the types of audio programming are presented to the end user at the specified locations.

The route may be a regularly traveled route, such as a route to work or a route home from work. The end user may specify any type of audio programming to associate with positions along the route. For example, the end user may specify weather reports, news reports, traffic reports, sports, stock market reports, and so on. The end user may also select any location along the route at which a particular type of audio programming is to be presented and may specify the location in various different ways. For example, the end user may select a physical location along the route, such as the geographic coordinates of a point along the route, an intersection along the route, a road segment along the route, a point of interest along the route, and so on. The end user may also specify a location along the route by time-of-travel. For example, a location may be specified as 10 minutes before arrival at the destination.

According to this embodiment, the route-controlled audio programming feature is provided by an application that is included in the navigation system. Referring to FIG. 2, a route-controlled audio programming application 400 is included among the navigation applications 228. The route-controlled audio programming application 400 may be a separate, standalone application, or alternatively, the route-controlled audio programming application 400 may be included as part of one of the other applications. According to still another alternative, the route-controlled audio programming application 400 may be part of another system in the vehicle, such as the audio system, an Internet access system, a satellite radio system, a telematics system, and so on.

A. Designating Audio Programming for Locations Along Route

A process by which an end user of the navigation system 110 can designate audio programming to be presented at specific locations along a route is described in connection with FIGS. 3–8.

Figure 3:
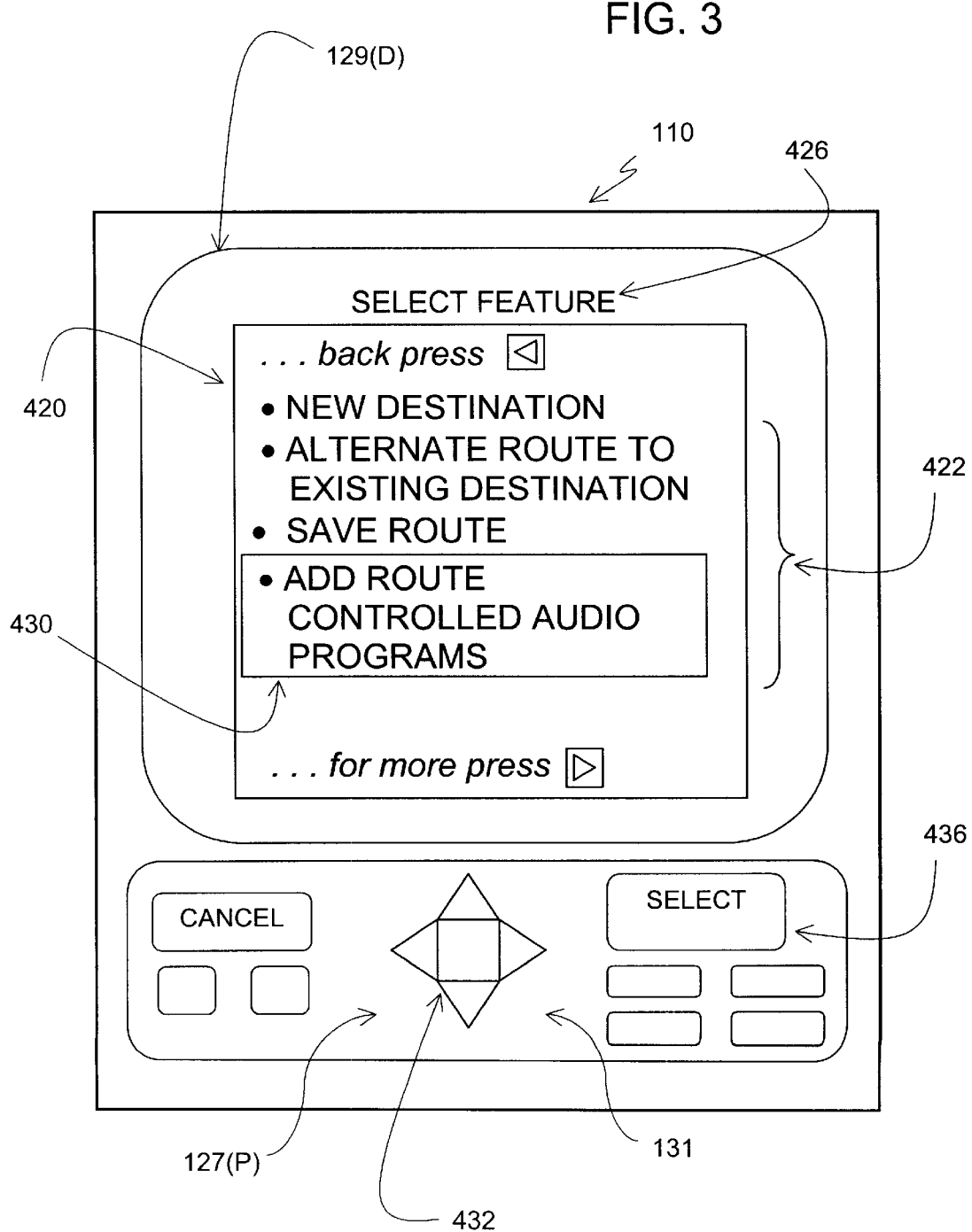
FIGS. 3–8 show exemplary display screens of the navigation system of FIG. 1 during a process whereby types of audio programming are associated with specific locations along a predetermined route.

FIG. 3 illustrates the front panel of the navigation system 110. The front panel of the navigation system 110 may be installed in the dashboard of the vehicle (111 in FIG. 1) or elsewhere. FIG. 3 shows portions of the user interface 131 including the display 129(D) and the input panel 127(P). Shown on the display 129(D) of the navigation system 110 is a menu 420. The menu 420 presents a plurality of available features 422. The user is prompted by a message 426 to choose one of the available features 422. One of the features is highlighted with an outlining box 430. The user can operate the keypad 127(P) of the user interface 131 to move the outlining box 430 up or down in order to change the feature highlighted with the outlining box 430. For example, the user may manually press a toggle 432 to shift the outline box 430. When the outlining box 430 is over the feature that the user wants to choose, the user presses another key to select the highlighted feature. For example, the user may press a "SELECT" key 436. In FIG. 3, the feature labeled "ADD ROUTE CONTROLLED AUDIO PROGRAMS" is highlighted with the outlining box 430 and the user can select this item by pressing the "SELECT" key 436. (Other features that are available on this menu 420 include calculating a new route to a new destination, calculating alternative routes to the existing destination, and saving a route.)

Figure 4:
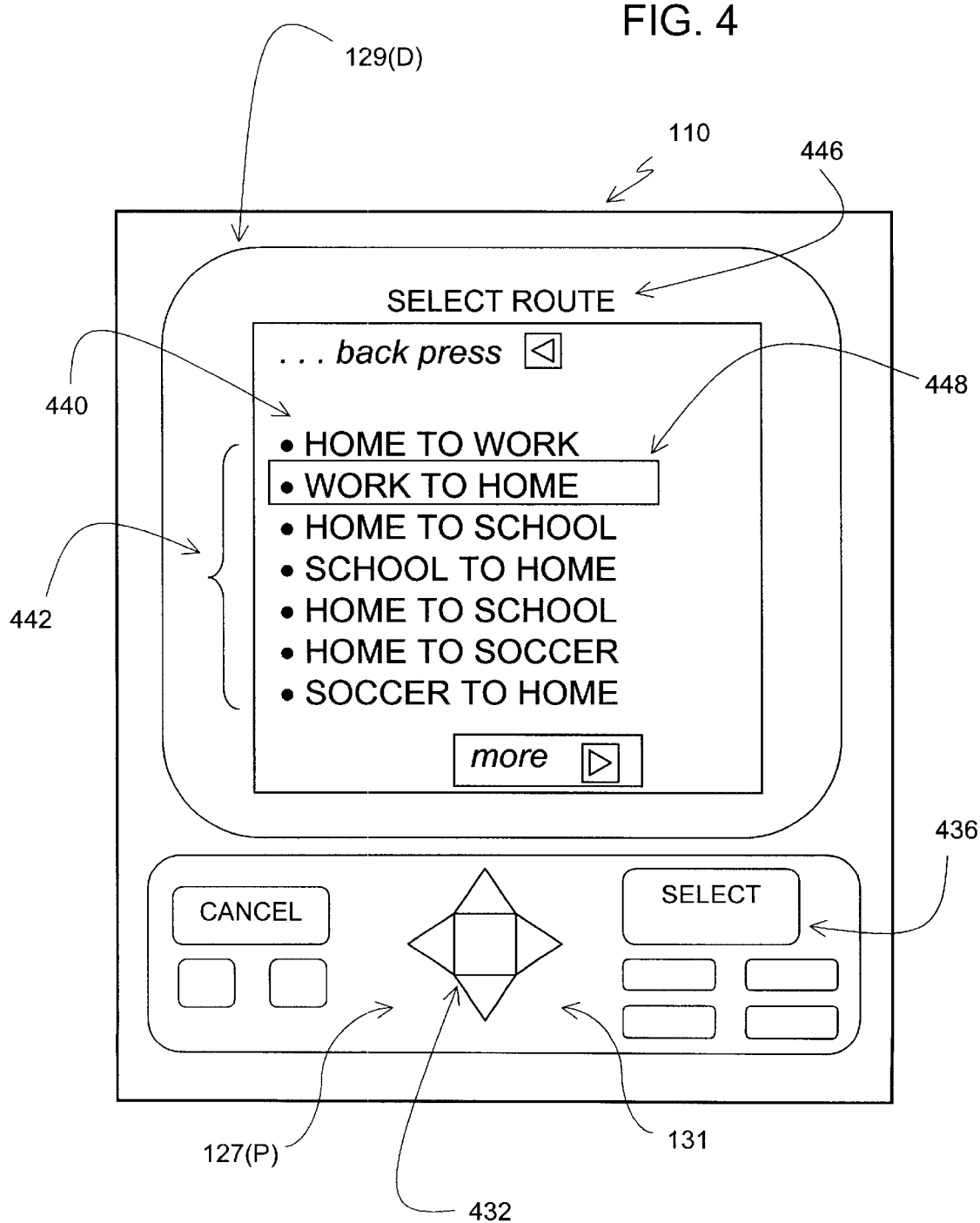

When the user selects the feature that provides for adding route-controlled audio programming, another menu screen is presented. An example of this menu screen is shown in FIG. 4. In FIG. 4, a menu 440 on the display 129(D) presents a list 442 that identifies routes. The routes on the list 442 have been previously identified and stored in the navigation system. The list 442 may include routes that the user has chosen to be stored in the navigation system (e.g., using the feature listed on the menu 420 in FIG. 3). The list 442 may also include routes that have been detected automatically by a feature in the navigation system that detects frequently traveled routes and then stores data identifying the frequently traveled routes in a memory storage in the navigation system. The user is prompted by a message 446 on the menu 440 to make a selection. One of the selections is highlighted with an outlining box 448. In the embodiment of FIG. 4, the item "WORK TO HOME" is highlighted with the outlining box 448 and the user can select this item by pressing the "SELECT" key 436.

Figure 5:
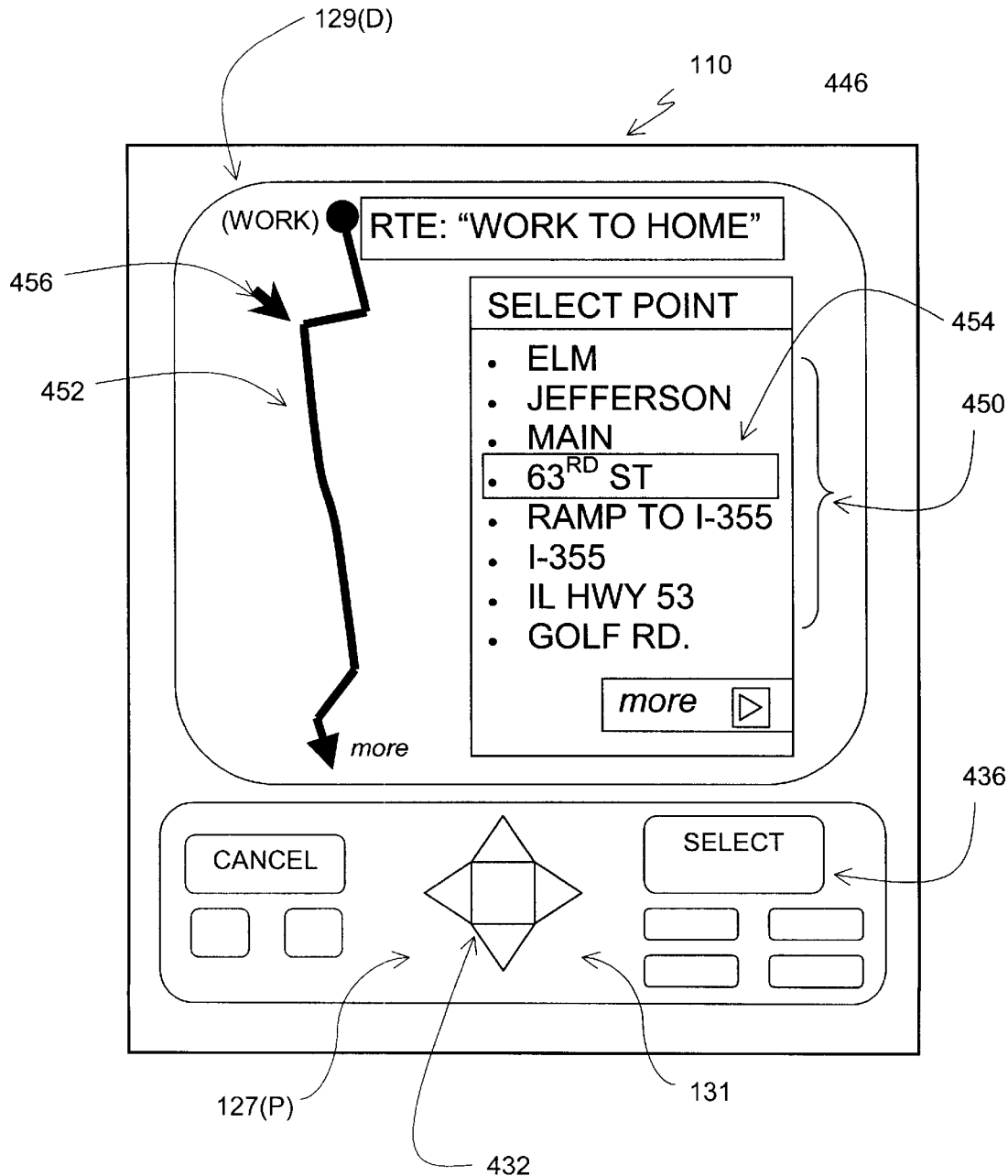

After the user selects the route to which to add route-controlled audio programming, the user is provided with a means to select the points along the route to associate with audio programming. Referring to FIG. 5, the user is presented with a list 450 on the display 129(D). The list 450 identifies the roads in the route that had been selected by the user. Also shown on the display screen 129(D) is a graphical depiction 452 of the route (or a portion thereof) that had been selected by the user. An outlining box 454 highlights one of the roads in the route. An indication 456 appears next to the graphical depiction 452 of the route. The indication 456 may be an arrow or other marker. The indication 456 appears next to the graphical depiction 452 at a location that corresponds to the road that is highlighted with the outlining box 454. By using the user interface 131, the user is able to select any road in the route and any point along any road in the route.

Figure 6:
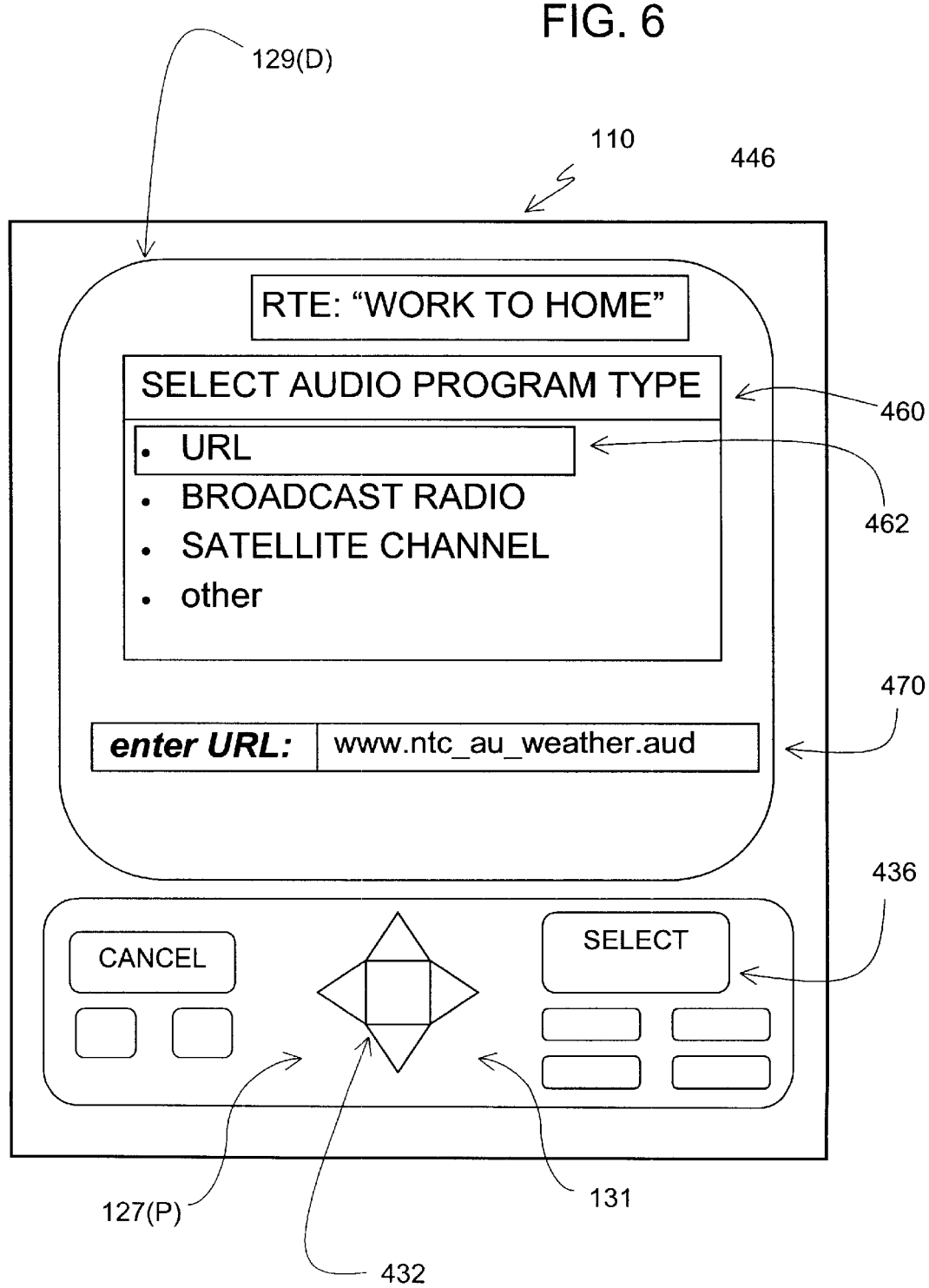

After the user has selected the road in the route and the point along the road in the route to which to associate with audio programming, the user is presented with a means to select a type of audio programming. FIG. 6 shows a menu 460 on the display 129(D) that allows the user to select a type of audio programming to associate with the location that had been selected using the screen in FIG. 5. In FIG. 6, the user is provided with several different ways to select audio programming. The menu 460 allows the user to select a type of audio programming by URL, by broadcast radio, by satellite radio channel, or other means. An outlining box 462 is used to highlight one of the selections. If the user chooses to select the type of audio programming by URL, the user is provided with a means to enter the URL from which a type of audio programming is available for downloading from the Internet. As shown in the embodiment of FIG. 6, if the user chooses to select a type of audio programming by URL, an address window 470 appears in the lower portion of the screen. The address window 470 allows the user to enter the URL at which is located audio programming of the type desired by the user. The user may enter the URL using the keypad 127(P) of the user interface 131.

Figure 7:
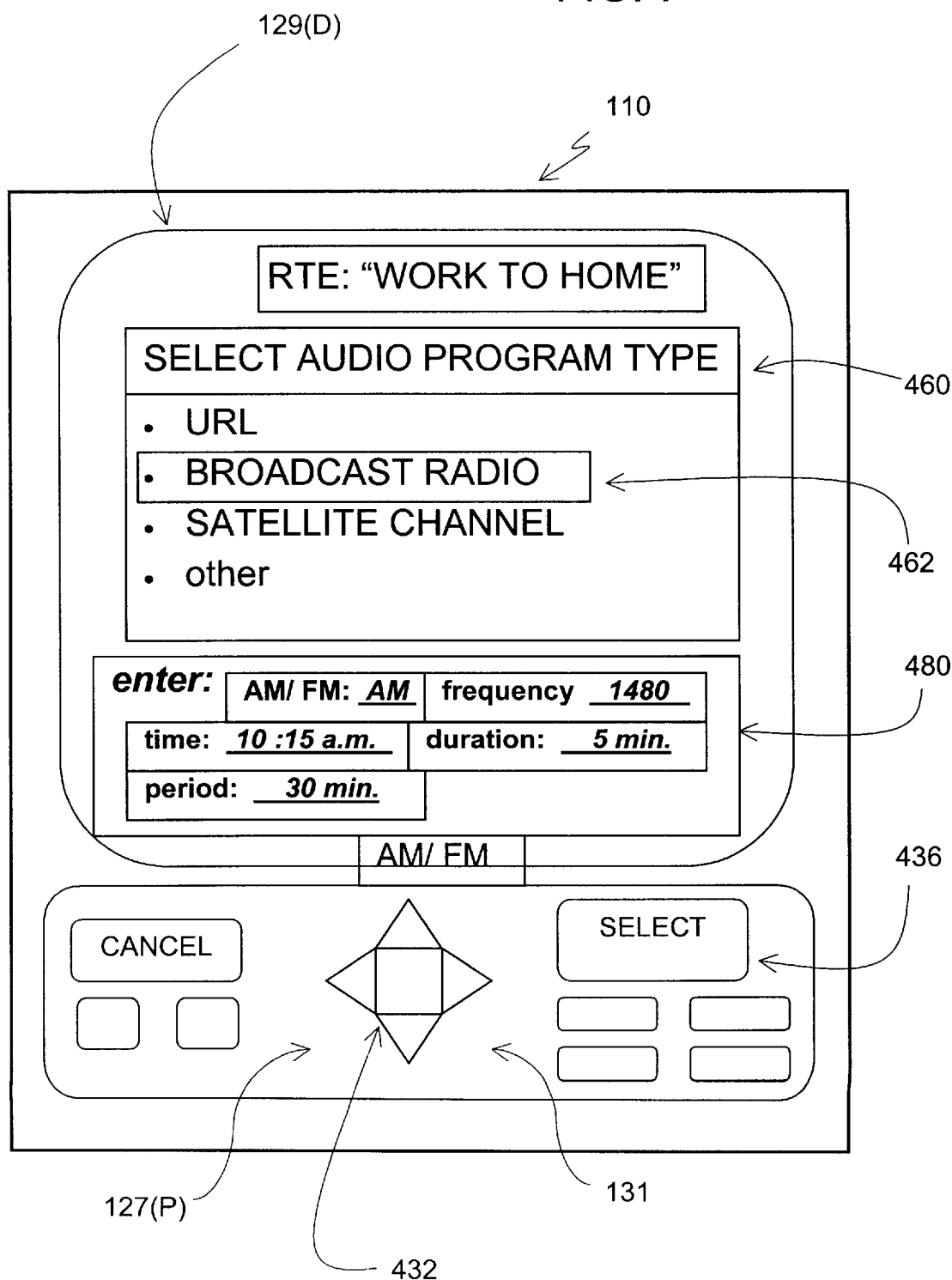

If the user decides to select the type of audio programming by broadcast radio, the user is then presented with a menu screen like the one shown in FIG. 7. In FIG. 7, the upper portion of the display screen 129(D) shows the same menu 460 as in FIG. 6. In FIG. 7, a menu 480 allows the user to enter a band (e.g., AM, FM, or others), a frequency, a time, a duration, and a period. Some AM and FM radio stations broadcast specific types of programming at regular times throughout the day. For example, some radio stations broadcast the news on the hour and the weather every 15 minutes. Using the menu 480 on the display screen shown in FIG. 7, the user can identify a radio station by frequency and identify specific, regular times. These are the times at which the radio station broadcasts the specific type of audio programming that the user would like to have associated with the selected location.

Figure 8:
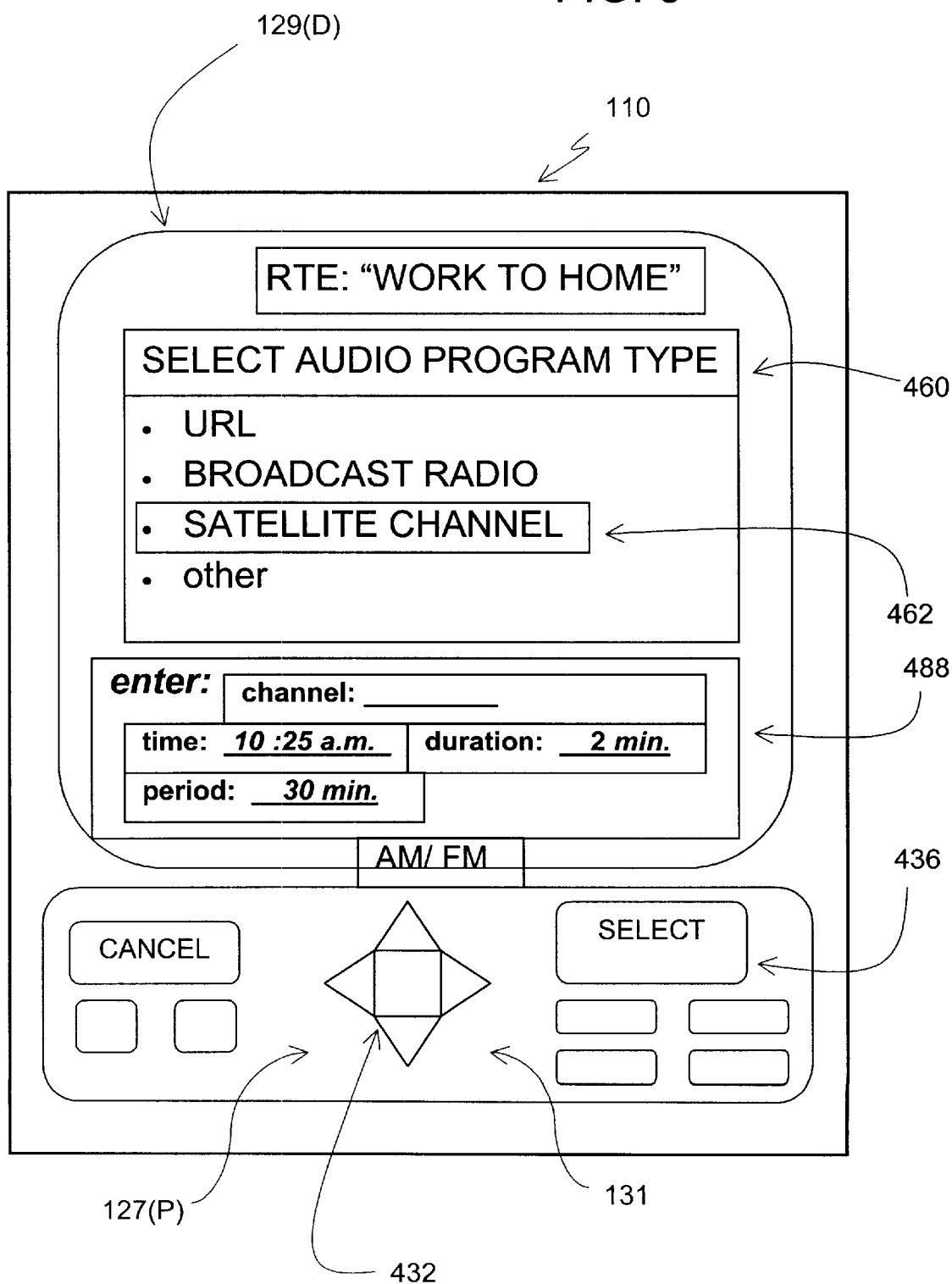

If the user decides to select the type of audio programming by satellite channel, the user is then presented with a menu screen like the one shown in FIG. 8. In FIG. 8, the upper portion of the display screen 129(D) shows the same menu 460 as in FIGS. 6 and 7. In FIG. 8, a menu 488 allows the user to enter a channel, a time, a duration, and a period. The selection of programming from a satellite channel is similar to the selection of programming from an AM or FM channel.

After the user has selected the type of audio programming to associate with a position along a route, the user may select another position along the route to associate with a type of audio programming. If the user has finished selecting types of audio programming to associate with positions along the route, the route-controlled audio programming application 400 allows the user to save the selections. Referring to FIG. 2, data indicating the types of audio programming and the associated locations are stored in a file 490 in a memory 492 in the navigation system 110. The route-controlled audio programming application 400 can then be used to associate types of audio programming with positions along another route.

B. Operation

After the user has operated the route-controlled audio programming application 400 to associate types of audio programming with positions along a route, the route-controlled audio programming application 400 operates automatically as the vehicle is being driven. The operation of the route-controlled audio programming application 400 is described in connection with FIGS. 9 and 10.

FIG. 9 shows a process 500 performed by the route-controlled audio programming application 400. As the vehicle 111 is being driven, the route-controlled audio programming application 400 receives data indicating the vehicle position from the positioning application 256 (Step 510). Based on these data, the route-controlled audio programming application 400 attempts to match the traveling path of the vehicle to one of the stored routes (490 in FIG. 2) that has audio programming associated with it (Step 520). When attempting to match the traveling path of the vehicle to one of the stored routes, the route-controlled audio programming application 400 compares the road segments upon which the vehicle has traveled to the road segments contained in the stored routes in order to find matches. When the route-controlled audio programming application 400 attempts to match the traveling path of the vehicle to the stored routes, an exact match between all the road segments upon which the vehicle has traveled and the road segments in one of the stored routes is not required. For example, if the traveling path of the vehicle does not exactly match one of the stored routes, but generally matches one of the stored routes, a determination can be made that the vehicle is traveling on the stored route. The route-controlled audio programming application 400 may take other factors into account when attempting to match the vehicle path to one of the stored routes. For example, the route-controlled audio programming application 400 may take into account the time at which the driving route was begun, the location of the starting point of the driving route, and so on.

If the traveling path of the vehicle is determined to match one of the stored routes that has audio programming associated with it (Steps 520 and 526), the route-controlled audio programming application 400 accesses the sources of the types of audio programming associated with the route in order to obtain the desired audio programming (Steps 530 and 540). When performing these steps, the route-controlled audio programming application 400 takes into account any timing information associated with the audio programming. For example, if user associated a traffic report with a location on the route that the vehicle is expected to reach in 10 minutes and a stock market report with a location on the route that the vehicle is expected to reach in 20 minutes, the route-controlled audio programming application 400 will attempt to obtain the traffic report before it attempts to obtain the stock market report. On the other hand, if the user indicated (using the menu screen in FIG. 7) that stock market reports were available only every 60 minutes at 15 minutes after the hour and the current time is 10 minutes after the hour, the route-controlled audio programming application 400 may obtain the stock market report first because that would be the only time to obtain the stock market report before the vehicle reaches the location at which the stock market report was to be presented.

When the route-controlled audio programming application 400 accesses the sources of audio programming associated with the route, copies of the audio programming are stored in a data storage device in the navigation system (Step 550). The route-controlled audio programming application 400 attempts to update the stored audio programming. For example, if a newer weather report becomes available before the vehicle has reached the location at which the weather report is to be presented to the end user, the route-controlled audio programming application 400 accesses and stores the newer weather report. The older weather report may be discarded or may be saved as a backup in case an error occurs when obtaining or saving the newer weather report.

As the vehicle continues along the route, the route-controlled audio programming application 400 matches the position of the vehicle to the positions associated with audio programming (Step 560). When the vehicle reaches a position associated with a particular type of audio programming, the route-controlled audio programming application 400 retrieves the most recent copy of the audio programming that had been stored and presents the audio programming to the user (Step 570). The audio programming may be presented to the user via the user interface (i.e., speaker 129(S)) of the navigation system or via the speakers of the vehicle audio system. As the vehicle continues further along the route, additional stored types of audio programming are presented to the user as the vehicle reaches the locations to which these types of audio programming were associated (Step 580). If there are no more locations along the route to which a type of audio programming is associated, the process 500 ends (Step 590).

FIG. 10 illustrates a route 600 upon which the vehicle 111 with the navigation system 110 that has the route-controlled audio programming feature travels. The origin and destination of the route are marked. The route is one that the user regularly travels. Using the route-controlled audio programming application (400 in FIG. 2), audio programming has been associated with specific locations along the route. The audio programs are stored in advance of when they are needed by the route-controlled audio programming application. As shown in FIG. 10, audio programs are presented to the driver at specific location as the vehicle is driven along the route. When the vehicle is at the location 610, a traffic report audio program is presented to the vehicle driver. When the vehicle is at the location 620, a stock market report audio program is presented to the vehicle driver. When the vehicle is at the location 630, a weather report audio program is presented to the vehicle driver.

III. ALTERNATIVES

In the embodiments described above, audio programming was associated with one or more locations along a route to a destination. In an alternative embodiment, audio programming may be presented to a vehicle user who is not necessarily following a route to a destination. According to an alternative embodiment, audio programming can be associated with a proximity to a designated location. For example, according to this alternative embodiment, a user can specify to the navigation system to provide a specific type of audio programming whenever the vehicle is within a specified distance (or time-of-travel) of a specified location. As an example, the user may want to hear the weather report just before arriving at work. Using this embodiment, the end user operates the route-controlled audio feature of the navigation system to specify the type of audio programming (e.g., weather), a distance (e.g., 1 mile or 3 minutes), and a location (e.g., his/her work address). Then, while the end user is driving, the route-controlled audio feature obtains an audio weather report and stores the audio weather report in a memory of the navigation system. On a regular basis after storing the audio weather report, the route-controlled audio programming feature obtains and stores updated audio weather reports. When an updated audio weather report is obtained, the prior audio weather report may be discarded. As long as the user does not drive within the specified distance (e.g., 1 mile or 3 minutes of driving time) of work, the route-controlled audio feature obtains and stores updated audio weather reports. When the vehicle is driven within the specified proximity (i.e., 1 mile or 3 minutes of driving time) of the specified location (e.g., work), the route-controlled audio programming feature retrieves the most recently stored audio weather report and presents the audio weather report to the end user.

An advantage of this embodiment is that an end user does not have to be following a route to a destination in order to obtain specific types of desired audio programming.

It is intended that the foregoing detailed description be regarded as illustrative rather than limiting and that it is understood that the following claims including all equivalents are intended to define the scope of the invention.

I claim:

1. A method implemented by a navigation system installed in a vehicle comprising:

receiving input from a vehicle user that specifies a type of audio programming to be presented to the vehicle user at a stage of a route to a destination and further wherein said input defines each stage along the route that corresponds to each type of audio programming specified by the vehicle user; and storing data in said navigation system that represents said input.

2. The method of claim 1 further comprising:

when the vehicle is located at the stage of the route, presenting the vehicle user with the audio programming associated with the stage.

3. The method of claim 1 further comprising:

prior to when the vehicle is at the stage, obtaining the audio programming associated with the stage.

4. The method of claim 1 further comprising:

prior to when the vehicle is at the stage, obtaining the audio programming associated with the stage; and storing the audio programming in a memory in the vehicle until the vehicle is at the stage.

5. The method of claim 1 wherein the type of audio programming comprises a weather report.

6. The method of claim 1 wherein the type of audio programming comprises a traffic report.

7. The method of claim 1 wherein the stage is immediately prior to reaching the destination.

8. A method implemented by a navigation system installed in a vehicle comprising:

determining a current location of the vehicle;

as the vehicle travels along a route to a destination, determining whether the current location of the vehicle matches a position along the route specified by a user of the vehicle as being associated with a specific type of audio programming; and if the current location of the vehicle matches the position along the route specified by the user of the vehicle as being associated with the specific type of audio programming, presenting the user of the vehicle with the audio programming of the specific type associated with the position by the user.

9. The method of claim 8 further comprising:

prior to when the vehicle is at the position along the route specified by the user of the vehicle as being associated with a specific type of audio programming, obtaining the audio programming associated with the position.

10. The method of claim 8 further comprising:

prior to when the vehicle is at the position along the route specified by the user of the vehicle as being associated with a specific type of audio programming, obtaining the audio programming associated with the position; and storing the audio programming in a memory in the vehicle until the vehicle is at the position.

11. The method of claim 8 further comprising:

prior to when the vehicle is at the position along the route specified by the user of the vehicle as being associated with a specific type of audio programming, obtaining the audio programming associated with the position;

storing the audio programming in a memory in the vehicle until the vehicle is at the position; and updating the audio programming stored in the memory if newer audio programming of the type becomes available.

12. The method of claim 8 wherein the type of audio programming comprises a weather report.

13. The method of claim 8 wherein the type of audio programming comprises a traffic report.

14. The method of claim 8 wherein the position along the route specified by the user of the vehicle as being associated with a specific type of audio programming is immediately prior to reaching the destination.

15. The method of claim 8 further comprising:

prior to determining whether the current location of the vehicle matches a position along the route associated with a specific type of audio programming, obtaining input from the user of the vehicle as to the type of audio programming to associate with each position along the route.

16. The method of claim 15 further comprising:

storing data in said navigation system that indicates said input.

17. The method of claim 8 further comprising:

prior to determining whether the current location of the vehicle matches a position along the route associated with a specific type of audio programming, obtaining input from the user of the vehicle indicating where to obtain said audio programming.

18. The method of claim 8 further comprising:

prior to determining whether the current location of the vehicle matches a position along the route associated with a specific type of audio programming, determining whether the vehicle is traveling along a route to which audio programming is associated.

19. A navigation system installed in a vehicle comprising:

an application that determines a current location of the vehicle; and an application that determines whether the current location of the vehicle matches any of a plurality of locations along a predetermined route to which a user of the navigation system has associated a specific type of audio programming as the vehicle travels along a route to a destination and presents the user of the vehicle with the audio programming associated with the position if the current location of the vehicle matches any of the positions along the route associated with a specific type of audio programming.

20. The navigation system of claim 19 further comprising:

a memory that stores the audio programming prior to when said audio programming is presented to the user.

* * * * *